(12) United States Patent
Collins et al.

(10) Patent No.: US 7,248,165 B2
(45) Date of Patent: Jul. 24, 2007

(54) METHOD AND APPARATUS FOR MULTIPLE FREQUENCY RFID TAG ARCHITECTURE

(75) Inventors: Timothy J. Collins, Homer Glen, IL (US); David P. Gurney, Carpentersville, IL (US); Stephen L. Kuffner, Algonquin, IL (US); Richard S. Rachwalski, Lemont, IL (US)

(73) Assignee: Motorola, Inc., Schaumburg, IL (US)

( * ) Notice: Subject to any disclaimer, the term of this patent is extended or adjusted under 35 U.S.C. 154(b) by 211 days.

(21) Appl. No.: 10/937,208

(22) Filed: Sep. 9, 2004

(65) Prior Publication Data

US 2005/0052283 A1    Mar. 10, 2005

Related U.S. Application Data

(60) Provisional application No. 60/501,467, filed on Sep. 9, 2003.

(51) Int. Cl.
*G08B 13/14* (2006.01)
(52) U.S. Cl. .................... 340/572.1; 340/572.7
(58) Field of Classification Search ............ 340/572.1, 340/572.7, 10.1; 343/853, 725, 893
See application file for complete search history.

(56) References Cited

U.S. PATENT DOCUMENTS

| | | | |
|---|---|---|---|
| 6,018,299 A | | 1/2000 | Eberhardt |
| 6,025,725 A | * | 2/2000 | Gershenfeld et al. ....... 324/652 |
| 6,091,332 A | | 7/2000 | Eberhardt et al. |
| 6,094,138 A | | 7/2000 | Eberhardt et al. |
| 6,107,920 A | | 8/2000 | Eberhardt et al. |
| 6,147,605 A | * | 11/2000 | Vega et al. ............... 340/572.7 |
| 6,243,013 B1 | * | 6/2001 | Duan et al. ............... 340/572.7 |
| 6,246,327 B1 | | 6/2001 | Eberhardt |
| 6,265,977 B1 | * | 7/2001 | Vega et al. ............... 340/572.7 |
| 6,611,199 B1 | | 8/2003 | Geiszler et al. |
| 6,720,866 B1 | * | 4/2004 | Sorrells et al. ............ 340/10.4 |
| 6,732,923 B2 | * | 5/2004 | Otto ........................... 235/383 |
| 6,754,190 B2 | | 6/2004 | Gurney et al. |
| 6,982,452 B2 | * | 1/2006 | Beigel ........................ 257/303 |

(Continued)

OTHER PUBLICATIONS

Sanjay Sarma, David L. Brock & Kevin Ashton, "The Networked Physical World Proposals for Engineering the Next Generation of Computing, Commerce & Automatic-Identification", Oct. 1, 2000 distribution restricted to sponsors until Jan. 1, 2001, p. 10, section 5.

Guy Theunis, "What about RFID? What are the possible frequencies?", May 2004.

(Continued)

*Primary Examiner*—Toan N. Pham

(57) ABSTRACT

The present invention provides a multi-band, multi-mode RFID tag that uses a single antenna structure and integrated circuit to provide asset location information at any stage of a supply chain. The unified tag design operates at multiple frequencies (or bands) using the antenna structure, for example, 125 kHz, 13.56 MHz, 915 MHz, and 2.45 GHz, and preferably operates electrostatically (at lower frequencies) and electromagnetically (ay higher frequencies). An on-chip frequency monitor in the integrated circuit automatically determines which frequency is present and derives a local clock for the tag's integrated circuit, which can vary in accordance with the frequency or which can be constant. Alternatively, a phase locked loop circuit can be used to derive a local clock signal modulated into the interrogation signal. On-chip matching and power extraction circuits derive power for the tag from the interrogation signal, which is preferably passive. Additionally, a receiver can receive data from the interrogation signal.

27 Claims, 5 Drawing Sheets

U.S. PATENT DOCUMENTS 6,999,028 B2 * 2/2006 Egbert ................. 343/700 MS
2004/0263319 A1 * 12/2004 Huomo ...................... 340/10.2

OTHER PUBLICATIONS

Department of Commerce, Washington D.C., "Radio Frequency Identification—Opportunities and Challenges in Implementation", Apr. 2005, pp. 22-23, section heading—"Harmonization of RFID Frequencies".

Dejan S. Filipovic, John L. Volakis, "Design of a Multi-functional Slot Aperture (Combo-Antenna) for Automotive Applications—Motivation/Challenges/Objective—Antenna Design Challenges," Jun. 16-21, 2002, p. 1.

Nathan Cohen, "Fractals' new era in military antenna design," Aug. 1, 2005, p. 14, from www.rfdesign.com.

Yoonjae Lee and Suman Ganguly & Junho Yeo and Raj Mittra, "A Novel Conformal Multiband Antenna Design based on Fractal Concepts," 2002, pp. 92-95 IEEE.

Renu Bansal, P.K.Singhal & P.C.Sharma, "A Novel Multiband Antenna: Fractal Antenna," Oct. 12-14, 2005, pp. 1907-1910.

* cited by examiner

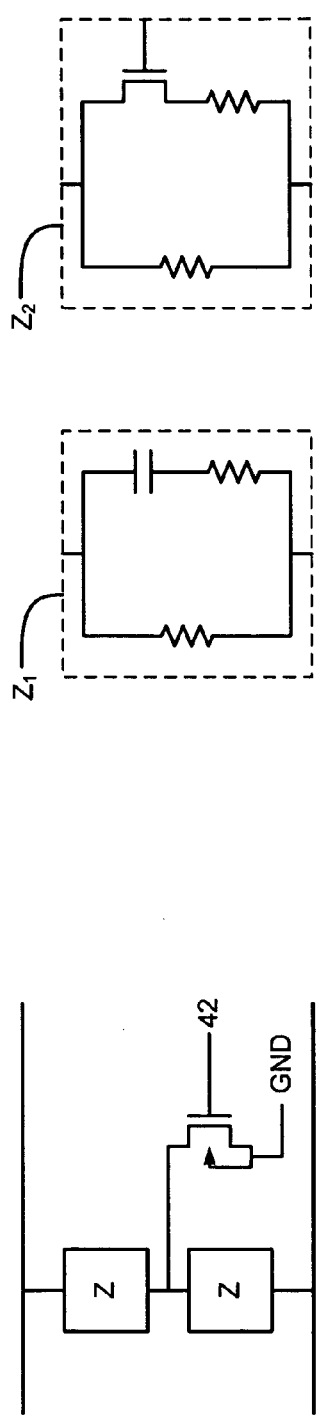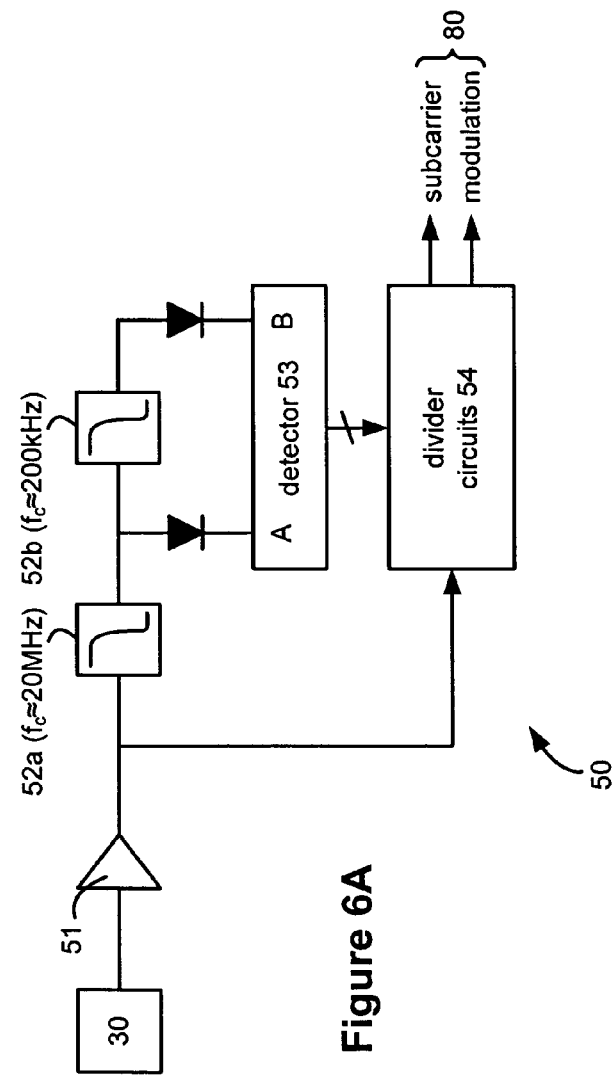
Figure 5
Figure 6A

METHOD AND APPARATUS FOR MULTIPLE FREQUENCY RFID TAG ARCHITECTURE

CROSS REFERENCE TO RELATED APPLICATIONS

This application is a nonprovisional application based on U.S. Provisional Application Ser. No. 60/501,467, filed Sep. 9, 2003, to which priority is claimed and which is incorporated herein by reference in its entirety.

FIELD OF THE INVENTION

The present invention relates generally to a method and apparatus for a multiple frequency radio frequency identification tag architecture.

BACKGROUND OF THE INVENTION

The efficiencies afforded by radio frequency identification (RFID) tags are becoming apparent in many supply chain management applications. Having timely electronic access to information concerning an item's progress through a supply chain is valuable for inventory management, controlling costs, theft prevention, shipping and labor scheduling, and many other aspects of supply chain operations. RFID is already utilized in some warehouse and shipping applications, where typically Ultra High Frequency (UHF) (e.g., 902-928 MHz) tags are used on a per-pallet basis because of their long read range performance. However, lower frequencies (e.g., 125 kHz, 13.56 MHz) are considered by many to be more appropriate for inventory or shelving applications. Lower frequency tags have an advantage over higher frequency tags in that they do not exhibit carrier signal reflection issues observed in tags operating at higher frequencies, but are shorter in range. It is generally accepted in the industry that no single frequency is most appropriate for monitoring all stages of the supply chain (i.e., shipping, inventory, shelving, etc.).

The following U.S. patents, which are incorporated herein by reference in their entireties, provide further details regarding RFID tag technology, and the manner in which such technology is made and used: U.S. Pat. Nos. 6,754,190; 6,246,327; 6,107,920; 6,265,977; 6,094,138; 6,091,332; 6,018,299; and 6,611,199.

Unfortunately, a multi-frequency approach presently means that an item needs to have multiple tags affixed to it, so that it can be successfully accounted for at each stage in the supply chain. The associated costs of not only the tags and readers but also the system operating logistics are impeding industry acceptance of multi-frequency applications, despite their benefits. Therefore, an industry need exists for a single tag that operates over multiple frequencies.

SUMMARY

The present invention provides a multi-band, multi-mode RFID tag that uses a single antenna structure and integrated circuit to provide asset location information at any stage of a supply chain. The unified tag design operates at multiple frequencies (or bands) using the antenna structure, for example, 125 kHz, 13.56 MHz, 915 MHz, and 2.45 GHz, and preferably operates electrostatically (at lower frequencies) and electromagnetically (at higher frequencies). An on-chip frequency monitor in the integrated circuit automatically determines which frequency is present and derives a local clock for the tag's integrated circuit, which can vary in accordance with the frequency or can be independent of frequency. Alternatively, a phase locked loop circuit can be used to derive a local clock signal modulated into the interrogation signal. On-chip matching and power extraction circuits derive power for the tag from the reader interrogation signal in the preferred embodiment. Additionally, the tag can receive data from the interrogation signal.

Load modulation can be used to provide information from the tag to the reader. The tag may employ a common communication protocol for all frequencies and/or modes. Alternatively, the tag may use different communication protocols for each frequency and/or mode, and such protocol choices may include unidirectional or bi-directional communications between the reader and the tag.

In one embodiment, an antenna structure for a RFID tag interrogatable by at least one reader is disclosed, comprising a first antenna responsive to an electrostatic interrogation signal at at least one first frequency; and a second antenna responsive to electromagnetic interrogation signal at at least one second frequency.

In another embodiment, a RFID tag interrogatable by at least one reader is disclosed, comprising a single antenna structure responsive to an electrostatic interrogation signal at at least one first frequency and an electromagnetic interrogation signal at at least one second frequency; and circuitry coupled to the antenna for providing data from the tag to the reader in response to either the electrostatic or electromagnetic interrogation signals.

In yet another embodiment, a RFID tag interrogatable by at least one reader is disclosed, comprising an antenna structure, comprising an electrostatic antenna responsive to an electrostatic interrogation signal of at least one first frequency, and an electromagnetic antenna responsive to an electromagnetic interrogation signal of at least one second frequency; and circuitry coupled to the antenna for providing data from the tag to the reader in response to either the electrostatic or electromagnetic interrogation.

Either the electrostatic or electromagnetic antennas can be comprised of two elements (e.g. two conformal plates or a dipole), and both are preferably operative at more than one frequency. The conductivity of the electrostatic antenna is preferably lower than the conductivity of the electromagnetic antenna. The electromagnetic antenna preferably couples directly to the circuitry, and may electrically intervene between the circuitry and the electrostatic antenna.

BRIEF DESCRIPTION OF THE FIGURES

A preferred embodiment of the invention is now described, by way of example only, with reference to the accompanying figures, in which:

FIG. 5 illustrates exemplary load modulation circuits used in the disclosed tag.

FIGS. 6A and 6B illustrate exemplary frequency detection circuits used in the disclosed tag.

DETAILED DESCRIPTION

Figure 1:
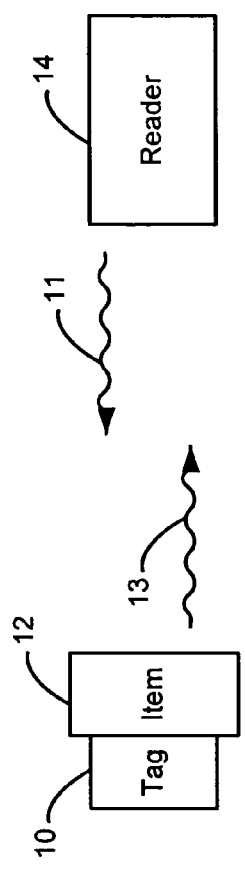
FIG. 1 illustrate an exemplary RFID tag and reader system.

FIG. 1 shows the basic context of a RFID system in which the disclosed RFID tag 10 can be used. In the system, one or more RFID readers 14 seek to identify one or more tags 10 that have been associated with (e.g., affixed to) an item, a palette of items, etc., by irradiating the tag(s) 10. As disclosed herein, the radiation 11 from the reader 14, also known as the reader's carrier or interrogation signal, can constitute one or more frequencies (e.g., 125 kHz, 13.56 MHz, 915 MHz, and 2.45 GHz), which provides substantial benefit for both long and short range detection of the tag 10 as discussed above. Although one reader 14 is shown, it should be understood that different readers 14 can be used to broadcast different frequencies, and that multiple readers 14 can be placed in an array in a real RFID tag location application to locate tag(s) 10 over a wide area. Readers 14 can be hand-held and portable, or fixed in set locations.

The tag 10 is responsive to the various frequencies of the radiation 11 from the reader 14, and can provide, amongst other things, an identification code, or Electronic Product Code (EPC), or other identifying indicia 13 in response. The tag may also receive data from the reader which may include operating commands, e.g. read/write commands. As one skilled in the art will appreciate, this is only a general overview of an RFID system. Further details concerning an operative system can be found in the U.S. patents incorporated by reference above.

More specifically, the disclosed RFID tag 10, as well as being responsive to multiple frequencies, operates using both electrostatic and electromagnetic modes. Either of these modes provides power to the tag 10, and allows the tag 10 to couple to the reader 14 via the electromagnetic mode over a subset of the frequencies and via the electrostatic mode over another subset of the frequencies. Accordingly, the tags 10 are referred to herein as "multi-band, multi-mode" tags (MBMM). The electrostatic mode refers to capacitive near-field coupling between the reader 14 and the tag 10 (e.g., approximately 1 meter in range), while the electromagnetic mode refers to far-field coupling between the reader 14 and the tag 10 (e.g., approximately a few meters in range) in which energy is transferred to the tag via propagating waves.

In short, the disclosed tag 10 operates over both these near and far fields, and accordingly a suitable reader 14 (or readers 14) likewise operates electrostatically and/or electromagnetically, and at one or more frequencies. While a single tag 10 can operate with several different readers 14 as noted above, a single tag 10 cannot operate at multiple frequencies simultaneously. The tag 10 may be passive, active, or semi-active. Preferably, the tag 10 is a dipole configuration, while the reader 14 is either a dipole or monopole configuration.

Figure 2:
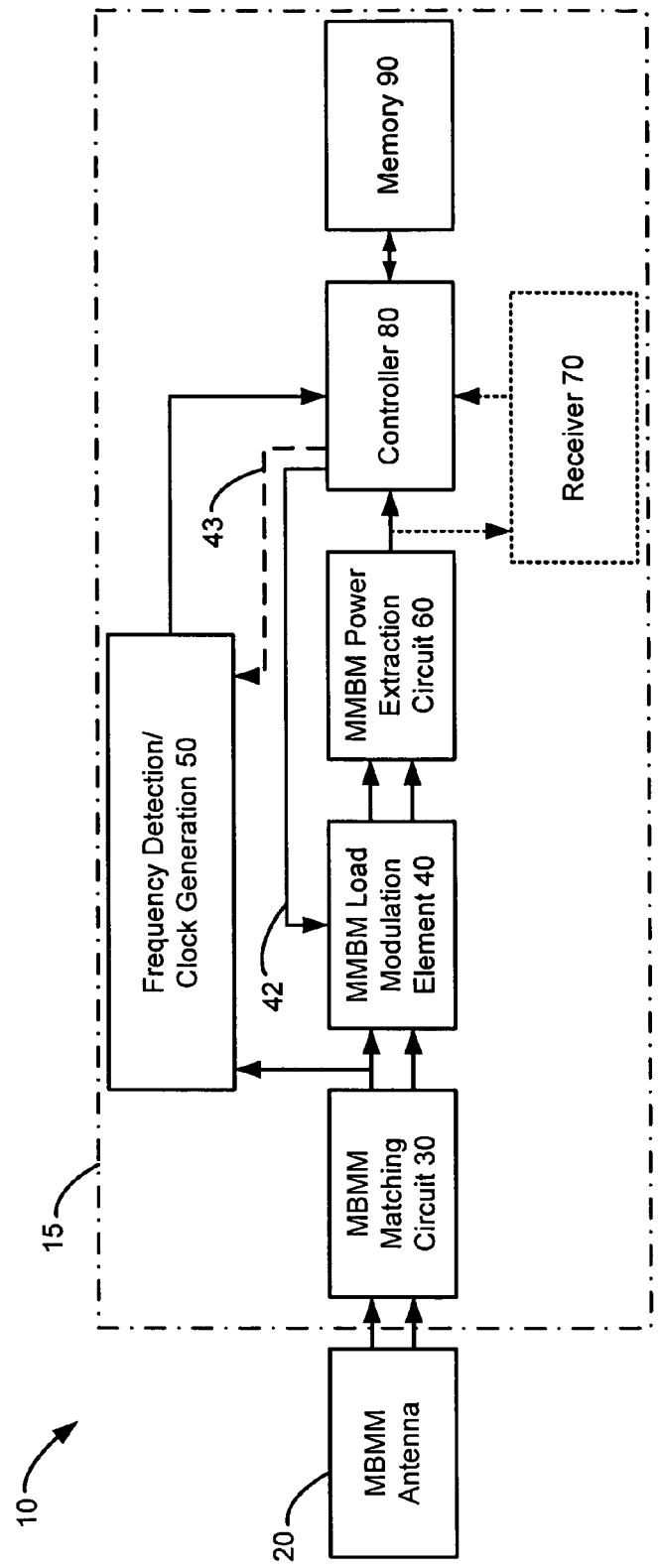
FIG. 2 illustrates the basic circuit blocks of the disclosed tag.

Referring to FIG. 2, the disclosed tag 10 comprises a multi-band, multi-mode antenna 20 connected to an integrated circuit 15. The integrated circuit 15 comprises several subcircuits (30, 40, 50, 60, 70, 80, and 90) whose operation and structure will be discussed in detail later. Prior to that, the basic physical structure of an embodiment of the tag's antenna 20 is discussed with respect to FIG. 3.

Figure 3:
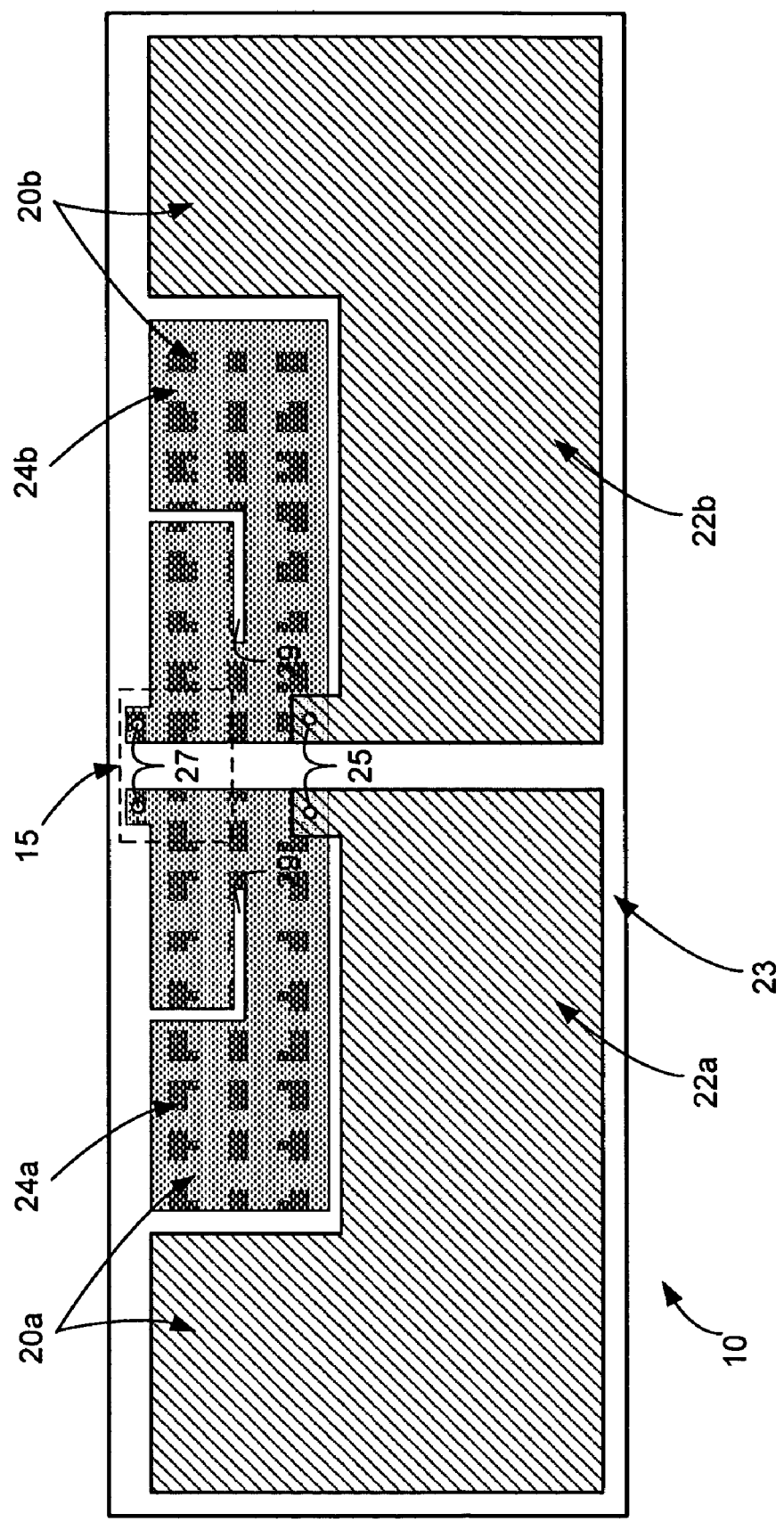
FIG. 3 illustrates a top down view of an embodiment of a multi-band, multi-mode antenna used in the disclosed tag.

FIG. 3 shows that the tag 10 can be constructed using a substrate 23 upon which the antenna 20 and integrated circuit 15 for the tag 10 are placed. The substrate 23 can comprise many suitable rigid or flexible materials, such as a traditional FR4 printed circuit board, mylar, polyimide, or even a simple paper substrate. Generally, the cheapest suitable substrate material is preferred to keep the cost of tag 10 to a minimum.

The antenna 20 is a single structure that includes portions (24) that are resonant at higher frequencies corresponding to the electromagnetic mode of operation (e.g., 900 MHz, 2.4 GHz), and portions (22) that are non-resonant to lower frequencies corresponding to electrostatic mode of operation (e.g., 125 kHz, 13.56 MHz). As discussed further below, the antenna 20 can be formed of multiple materials in which higher impedance materials are preferably used for electrostatic coupling and lower impedance materials are preferably used for electromagnetic coupling. These two materials may reside on the same plane of the substrate 23 or in different planes of the substrate 23. When operating electrostatically, the electromagnetic portions 24 can provide additional electrostatic coupling capacity to the reader 14. However, at higher frequencies relying on electromagnetic coupling between the reader 14 and the tag 10, the electromagnetic portions 24 are not appreciably affected by the electrostatic portions 22 because the electrostatic portion is connected at the lowest impedance point of the electromagnetic portion. The overall antenna 20 structure may occupy a two- or three-dimensional space.

Specifically, a higher conductivity material (low resistivity) is preferable for the electromagnetic portions 24 of the antenna 20, while a lower-cost, lower conductivity material (high resistivity) can be tolerated for the electrostatic portions 22 of the antenna 20. The transition between the higher and lower conductivity materials may be abrupt or continuous. It should be noted that the range performance of the antenna 20 at higher frequencies (the electromagnetic mode) depends on the conductivity of the materials used in the electromagnetic portions 24 and the proximity to the lossy electrostatic antenna, as the conductivity of both materials affects the electromagnetic antenna 24 efficiency. However, in the electrostatic mode of operation, a higher loss material can be tolerated for the electrostatic antenna 22 due to the high impedance at the interface between the tag and the reader.

FIG. 3 illustrates one possible embodiment for the structure of the multi-band, multi-mode antenna 20, which comprises an electrostatic antenna 22 coupled to an electromagnetic antenna 24, both of which are split in a dipole or plate configuration ("a" and "b"). In this embodiment, the elements 22a, 22b for the electrostatic antenna are coupled to the elements 24a, 24b of the electromagnetic antenna at contact points 25, which may comprise a via through the substrate or which may merely constitute an overlap of antenna materials. For example, lossy printer ink for elements 22a, 22b could simply be printed over metal elements 24a, 24b to make the connection. The elements 24a, 24b of the electromagnetic antenna are in turn coupled to leads (not shown) on the integrated circuit 15 at contact points 27, in a differential drive configuration. Generally, the antenna structure 20 is shown to scale in FIG. 3, and may measure approximately 5 inches by 2 inches in its entirety.

One skilled in the art will appreciate that there are many suitable ways to connect the integrated circuit 15 to the substrate 23, and ultimately to the antennas 22, 24. If necessary, an interposer (not shown) may be used to facilitate the connection between the integrated circuit 15 and the substrate 23, such as is disclosed in U.S. Pat. No. 6,265,977, which is incorporated herein by reference.

The elements or plates 22a, 22b of the electrostatic antenna do not resonate (as would the electromagnetic antenna 24 discussed below), but instead comprise capacitive electrodes active in the electrostatic (i.e., lower frequency) mode of operation. The plates 22a, 22b generally consist of two conducting plates of somewhat arbitrary geometry that preferably do not exhibit excessive cross-coupling. Because they work on the principle of capacitive coupling for which loss is not an issue, plates 22a, 22b do not need to be comprised of a highly-conductive material, such as silver ink or plated copper. Instead, black printer ink or graphite is sufficient for use in forming the plates 22a, 22b. Electrostatic coupling such as provided by electrostatic antenna 22 has been shown to work well for shorter range retail or shelving applications, and is further advantageous since the electrostatic antenna 22 may operate over extremely wide bandwidths (for example, from 125 kHz to 40 MHz).

Electromagnetic antenna 24, which by contrast operates via RF (UHF) coupling, is useful for longer-range communications to the tags 10. Specifically, electromagnetic antenna 24 has dipole elements 24a, 24b, permitting two resonant modes: one at 915 MHz, the other at 2.45 GHz. Multiple resonances in the electromagnetic mode can be achieved through a variety of techniques known in the art, such as through the use of slots 29 in the radiating surface, which force multiple current paths. As one skilled in the art understands, the dimensions of the partitions in the elements 24a, 24b created by the slots 29 determine the resonant frequencies.

For maximum efficiency, the electromagnetic antenna 24 is made with a good conductor, such as plated copper. Although the size or amount of the conductive material for the dipole elements 24a, 24b will affect the cost of the tag, compromises in conductivity will directly impact the efficiency of the antenna 24, hence the amount of power made available to the tag 10 as well as its read range. Resonance will also depend on the dielectric material of the substrate 23 and the relation between the various resonances of the dipole elements 24a, 24b. That being said, the size of dipole elements 24a, 24b are preferably only as big as necessary to reduce cost and size of the tag 10. Further details concerning the modeled performance of the electromagnetic antenna 24 are not repeated here for simplicity, but can be found in the provisional application upon which the present application is based, i.e., U.S. Provisional Application Ser. No. 60/501,467, filed Sep. 9, 2003, which is incorporated by reference in its entirety.

Although the electromagnetic antenna 24 is disclosed as having dual resonance, it should be noted that single resonance antennas may also be used. Moreover, a plurality of single resonance antennas may also be used (e.g., one that resonates at 915 MHz and one at 2.4 GHz) in lieu of the disclosed dual resonance structure. Additionally, the electromagnetic antenna 24 may through slotting or layout changes be made resonant at more than two frequencies.

In many cases, the size of a typical electromagnetic antenna 24 will be much smaller than is imposed by the packaging of the tag (which may be, for example, approximately the size of a box of cereal). In such cases, larger plates 22a, 22b would be possible for the electrostatic antenna 22, which would increases the effective coupling, and hence detectable range, in this mode of operation. Moreover, additional surface area may be added to the antenna 20, but would preferably be done so as to complement the resonant modes of the electromagnetic antenna 24 or at least in a manner that would not appreciably degrade its resonant modes. Such additional area could be composed of printed materials to maintain low manufacturing costs, but could also comprise a good conductor, if available. In the disclosed embodiment in which the relatively-lossy electrostatic antenna 22 is coupled to the electromagnetic antenna 24, some efficiency in the electromagnetic antenna 24 is compromised due to loss added by the electrostatic antenna 22, but this trade off in functionality might be suitable given reduced costs in particular applications.

In alternative embodiments, the electrostatic antenna 22 need not be coupled to the integrated circuit 15 via the electromagnetic antenna 24, but instead, like the electromagnetic antenna 24 could be directly coupled to the integrated circuit 15, perhaps through its own integrated circuit leads if necessary.

The electrostatic antenna 22 can be comprised of many shapes and sizes. Typically, the larger the electrostatic antenna 22 area, the better the performance, as noted above. By contrast, the electromagnetic antenna 24 portion of the design requires a well-defined and constrained geometry, and generally does not have the same luxury of performance improvements due to larger areas.

In some embodiments, separate electrostatic antenna 22 portions may not be necessary. For example, for close proximity coupling, the electromagnetic dipole elements 24a, 24b of the antenna 24 may provide sufficient surface area for acceptable electrostatic mode operation, thus obviating the need for separate electrostatic plates 22a, 22b. However, in the more general case, a larger electrostatic antenna 22 is preferred to enhance coupling and to permit larger ranges electrostatic coupling.

With the basic structure of the multi-band, multi mode antenna 20 now understood, attention is turned to the circuitry used in the tag 10, and again reference is made to FIG. 2. While such circuitry preferably resides in a single integrated circuit 15, it should be understood that the circuitry is not so limited and can comprise separate non-integrated circuitry fabricated from discrete components. As many aspects of the circuitry are well known in the RFID art, and/or are disclosed in the various patents incorporated herein by reference, these aspects are only briefly discussed, starting with the load modulation element 40.

The purpose of the load modulation element 40 (or load modulator 40) is to send data from the tag 10 (e.g., its ID code) to the reader 14 by modulating the impedance presented to the tag antenna terminals 27. Such data is transferred from the controller 80 to the load modulator 40 via signal 42. The load modulator 40 should create a large enough impedance change to be detected by the reader 14 without adversely impacting power transfer from the reader 14 to the tag 10. Although not shown in FIG. 2, the load modulator 40 may be coupled to the frequency detection circuit 50 to select an appropriate impedance change. Alternatively, the load modulator can comprise a frequency-varying impedance that automatically presents the appropriate impedance to the tag antenna 20, such as is shown in FIG. 5. In one embodiment, it may be advantageous to have a common modulation rate regardless of carrier frequency to support a common data rate received by the tags 10. Again, load modulation is well known in the RFID arts, and therefore the circuitry disclosed in FIG. 6 is merely exemplary.

Although shown in FIG. 2 as intervening between the matching circuits 30 and the power extraction circuits 60, one skilled in the art will understand that the load modulator 40 can appear in numerous different positions in the circuitry 15. For example, the load modulator 40 can also appear between the antenna 20 and the matching circuit 30, or between the power extraction circuits 60 and the controller 80—what is referred to as the "DC side" of the tag 10.

In the disclosed embodiment, the tag 10 is a passive tag, meaning that the tag's power to operate is derived from the energy of the radiation 11 sent from the reader. This requires both matching the frequency of the incoming radiation 11 and extraction of power from that matched frequency to provide a DC operating voltage for the circuitry in the passive tag 10. These functions are performed by matching circuitry 30 and power extraction circuitry 60 of FIG. 2, which are shown in further detail in FIG. 4. In an active tag, in which the tag is battery powered, power extraction may only be partially relied upon or may be dispensed with in its entirety.

Figure 4:
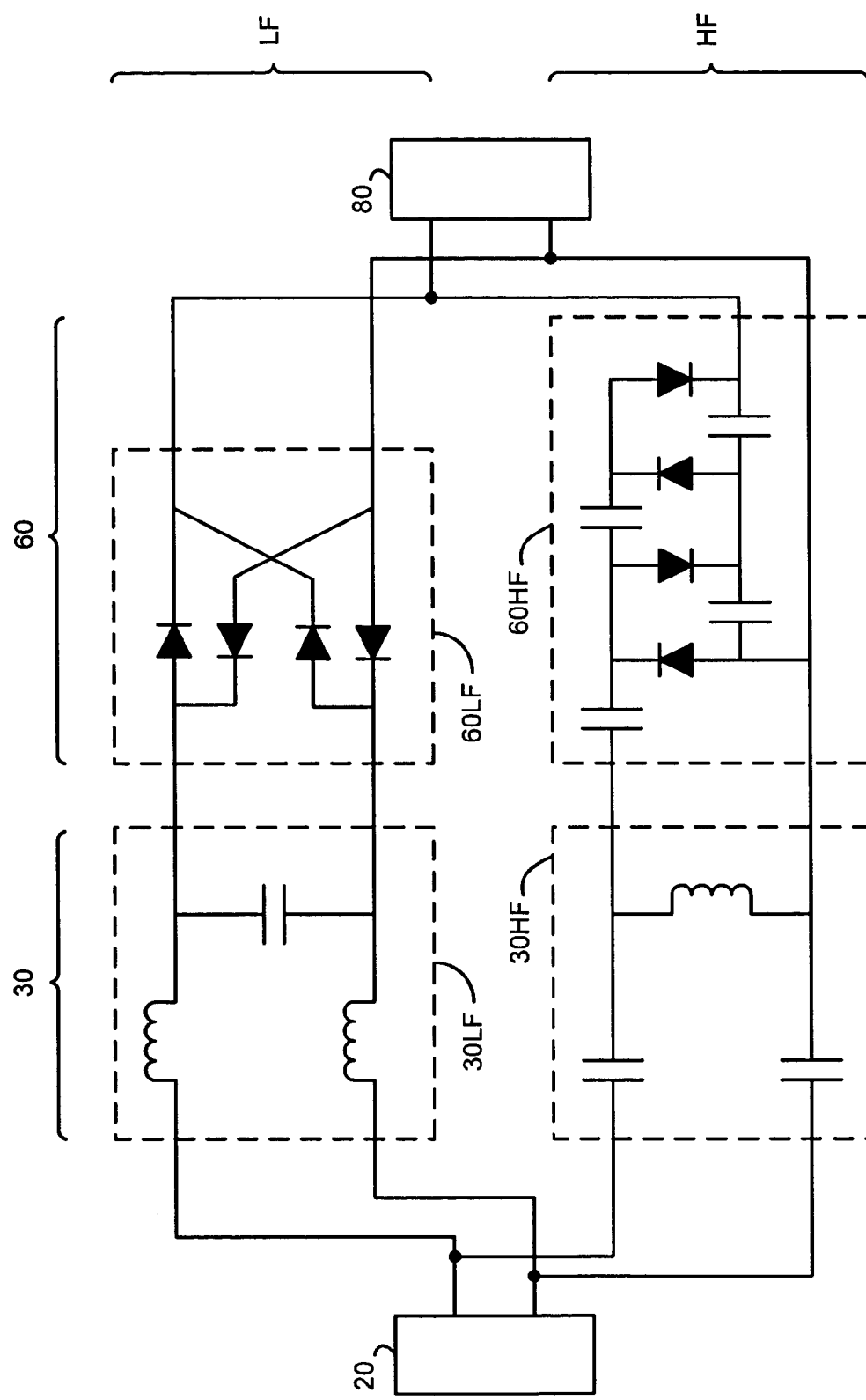
FIG. 4 illustrates exemplary matching and power extraction circuits used in the disclosed tag.

As shown in FIG. 4, the matching circuits 30 and power extraction circuits are preferably (but not necessarily) divided into two low frequency (LF) and high frequency (HF) branches. For the low frequency branch, the matching circuit preferably comprises a low-pass circuit 30LF, while the power extraction circuit preferably comprises a rectifier 60LF. For the high frequency branch, the matching circuit preferably comprises a high-pass circuit 30HF, while the power extraction circuit preferably comprises a charge pump or voltage multiplier circuit 60HF.

In the electrostatic mode of operation, i.e., at lower frequencies, the matching circuits 30 should present the highest impedance possible across the antenna terminals 27 to extract the greatest voltage swing from the reader's excitation field. By contrast, in the electromagnetic mode of operation, i.e., at higher frequencies, the matching circuit should present a conjugately-matched impedance across the antenna terminals 27 to allow maximum power transfer from the reader, and hence greatest operating range. For example, the matching circuit 30 may present an impedance of 10 s of kilo-Ohms across the antenna 20 in an electrostatic mode, and an impedance of approximately 100 Ohms in the electromagnetic mode. The matching circuit 30 must present the lower impedance at all electromagnetic frequencies of operation, and the higher impedance at all electrostatic frequencies of operation, which is facilitated by the high-pass 30HF and low-pass 30LF circuits respectively.

To delve into further details on these points, in electrostatic mode, the high impedance presented by the rectifier 60LF (and the DC-side circuitry) is desirable since it essentially acts as a resistive load. The low-pass filter is essentially transparent at low frequencies, and the high impedance of the rectifier appears directly across the antenna terminals. This is beneficial since the capacitive reactance to the reader forms a voltage divider with the rectifier impedance, and the higher this impedance, the larger the fraction of the reader voltage that appears at the rectifier input. In electromagnetic modes, the rectifier 60LF will still be high impedance (>1 kOhm), but the impedance of the antenna 20 will be a lower impedance (e.g., approximately 50 Ohms), although higher impedances are possible through the use of slots, folded dipoles, or longer or off-center-fed dipoles, etc. Since such a high impedance transformation is difficult at high frequencies, a lower impedance power extraction circuit such as a voltage multiplier 60HF is used. In this case, to optimize power transfer to the load in the preferred embodiment, the antenna impedance should be conjugately matched to the voltage multiplier 60HF load, as mentioned previously. The low-pass circuit 30LF serves to isolate the high frequency rectifier impedance from the antenna 20.

Again, the purpose of the power extraction circuit is to convert the power in the reader 14's carrier signal 11 into a DC operating voltage for the tag 10. It is well known in the art that there are multiple ways of extracting power from an AC signal, such as through the use of half-and full-wave rectifiers, charge pumps, and voltage multipliers. No matter what type of voltage conversion is selected, it is crucial that the impedance presented operates smoothly over the multiple frequency ranges. Rectifiers (such as 60LF) are better suited to large voltage swings typically encountered in the electrostatic mode, and present the desired high impedance. The voltage increase provided by the charge pumps or voltage multipliers (such as 60HF) are required in the electromagnetic mode due to the smaller voltage swings seen at maximum range of operation.

Providing power to the tag 10 at the different operating frequencies is only part of the problem that needs to be solved for multi-frequency tags of the sort disclosed; another problem comprises deriving clock signals to be used in the tag 10. In typical 125 kHz and 13.56 MHz systems, the local clocks are derived by dividing down the reader 14's signal: e.g., for the 125 kHz system, a 62.5 kHz subcarrier is generated by dividing by two, and is divided by 16 to yield a 7.8125 kHz modulation clock; and for the 13.56 MHz system, a 847.5 kHz subcarrier is generated by dividing by 16, and is divided by 128 to yield a 105.9375 kHz modulation clock.

For higher frequencies, the local clock can be divided-down, or it can be locally-generated by an on-chip oscillator, or it can be recovered from amplitude or phase detection of a clock signal modulated onto the reader 14's carrier. In embodiments using an on-chip oscillator but with no phase- or-frequency locking mechanism and no trimming, accuracy would be at best about 5-10% stable, and enough margin would have to be allowed in the air interface to account for the differences in local clocks on the tags. For air interfaces that require higher precision local clocking, the on-chip clock would need to be divided down from the carrier or locked to the carrier.

In any event, a clock divider circuit would need to know which frequency is present, which is the function of frequency detection/clock generation circuit 50 (FIG. 2). Detection of the frequency present in the reader 14's carrier can be accomplished in several different ways. In one embodiment, and referring to FIG. 6A, the reader 14's carrier is passed through a buffer 51 and sent to a cascade of low-pass filters (52a, 52b). The embodiment of FIG. 6A, for example, can detect a reader carrier of 125 kHz, 13.56 MHz, or 915 MHz because low-pass filters 52a, 52b are set in between these frequencies at cut-off frequencies of 20 MHz and 200 kHz respectively. Detector 53 detects which low-pass filters 52 have passed a signal: A=B=0 would imply that the carrier equals 915 MHz (for example); A=1, B=0 would imply that the carrier equals 13.56 MHz; and A=B=1 would imply that the carrier equals 125 kHz. (Of course, an additional filter at 2 GHz could also be used to identify the 2.4 GHz frequency, although not shown for clarity). On the basis of these determinations, divider circuits 54 can be used to divide the reader carrier in accordance with the displayed chart. For example, for a 915 MHz carrier, a 915 MHz/1024=893.5 kHz sub-carrier is generated along with a 915 MHz/8192=111.7 kHz modulation clock.

Figure 6B:
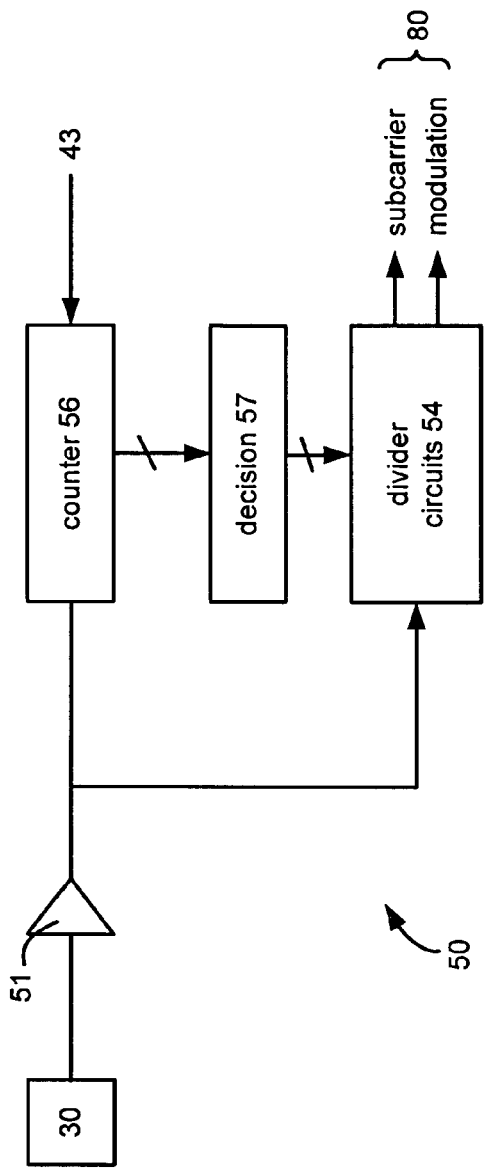

In another embodiment shown in FIG. 6B, an on-chip counter 56 counts a number of cycles of the reader carrier. The counting does not have to be precise; it merely has to be suitable to distinguish between 125 kHz, 13.56 MHz, and 915 MHz. So, for example, if the timer ran for about 32 µs (in accordance with count enable signal 43), the counter 56 would count around 4 or 5 edges at 125 kHz; around 430 edges for 13.56 MHz; around 29000 edges for 915 MHz; and around 77000 edges for 2.4 GHz. Alternatively, the counter 56 could stop counting out after 1000 counts (or 35000 counts) to limit the counter size, with such a count ensuring that the carrier was greater than 13.56 MHz (or 915 MHz). Ultimately, the decision block 57 would interpret the count value, and activate the divider circuits 54 accordingly. The counting embodiment of FIG. 6B might be preferred in an application in which the reader carrier frequencies are tightly grouped, and thus require a finer frequency assessment than the coarser filtered approach of FIG. 6A might provide.

To reduce power consumption in the tag 10, it is desirable to clock the internal circuits on the integrated circuit 15 at as low a frequency as possible. Once the carrier frequency has been determined in any of the manners stated above, a ripple counter can be used to create the correct sub-frequency for clocking. In one embodiment, the same clocking frequency is derived from all carrier frequencies through appropriate divide ratios.

Figure 7:
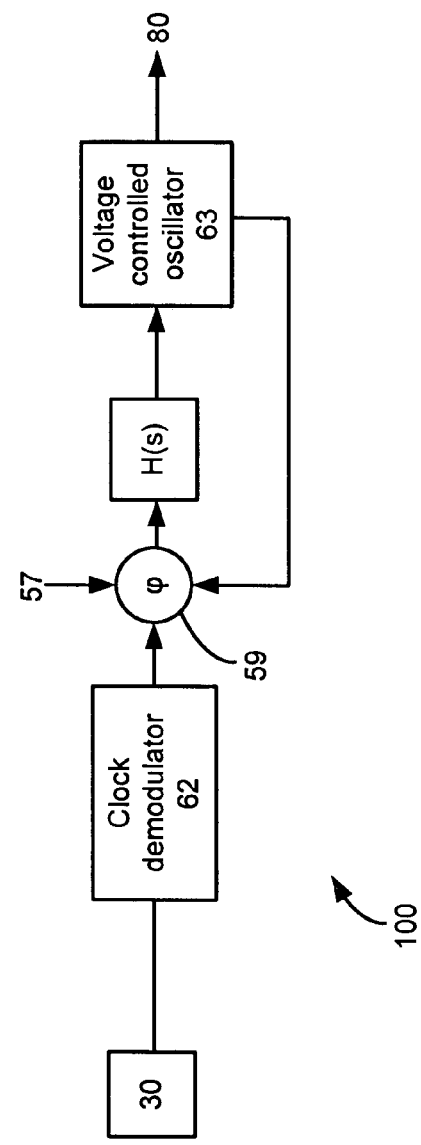
FIG. 7 illustrates an exemplary phase locked loop circuit useable in the disclosed tag.

However, in another embodiment, the frequency detection circuit 50 need only differentiate between electrostatic and electromagnetic frequencies. In the electrostatic mode, the carrier can be divided down as discussed above, whereas in the electromagnetic mode, a training clock is modulated onto the carrier and is acquired by an on-tag track-hold phase lock loop (PLL) or track-hold frequency lock loop 100, as is disclosed in FIG. 7, and which forms a part of the frequency detection/clock generation circuit 50. The track-hold PLL 100 functions to recover the training clock information sent by the reader. The reader demodulates the reader 14's carrier to acquire the training clock (62), which the track-hold PLL acquires during a training period using phase detector 59. After the training period, the track-hold PLL switches from acquire to hold via control signal 57, which, for example, disables an output of a charge pump used in the phase detector 59 (not shown, but well known to those skilled in the art). After the signal is held, the tag 10 is allowed to transmit data back to the reader 14. Over time, the track-hold PLL 100 will begin to drift, and as such periodic reacquisition may be required depending on the duration of the data transmissions.

In yet another embodiment, all reader carrier frequencies and/or modes generate the same clock frequencies. In an alternative embodiment, different sub-carriers and/or modulation rates can be used for each frequency and/or mode or a group of frequencies and/or modes.

The controller 80 is preferably a state machine whose primary function is to extract data stored in memory 90 (such as the tag's ID code) and pass it to the load modulator 40 in accordance with a specified communication protocol (e.g., ISO-15693). The controller 80 also generates various control signals used in the tags, such as those described or alluded to earlier. The controller 80 may contain a common logic section to be used for all operating frequencies and/or modes of operation to simplify the circuitry.

The memory 90 stores information relevant to the particular application. An example of this information may be an Electronic Product Code (EPC) for a retail supply chain application, or a mere ID code for the tag 10 in question. Depending on the application, the memory may be a ROM, RAM, EEPROM, FeRAM, DRAM, or the like.

The receiver 70 is not required in all useful applications. For example, a receiver 70 is not required for a uni-directional tag 10, i.e., a read only tag which only sends data to the reader 14 but which cannot receive data from the reader 14. If the tag 10 is bi-directional and can receive data from the reader 14, the receiver 70 is applicable. In most applications requiring bi-directional communications, the reader 14-to-tag 10 interface uses amplitude modulation of the carrier signal to send pertinent data to the tag 10. The receiver 70 in such tag embodiments therefore includes a demodulator (e.g., an ASK demodulator) to recover the data sent by the reader 14 using techniques well known in the art.

The present invention may be used on items inventoried or otherwise tracked in supply chain applications. Since it is multi-frequency, it is appropriate for all phases of the supply chain, including warehousing, shipping, in-store inventory/theft prevention and even purchasing/check-out. Of course, the disclosed multi-band, multi-mode tag 10 also has application outside of supply chain context. Moreover, the disclosed tag design can be used uni-directionally or bi-directionally, and can be passive (receiving power from the reader 14's carrier) or active (i.e., having a battery).

While the present invention has been described in conjunction with specific embodiments thereof, additional advantages and modifications will readily occur to those skilled in the art. The present invention, in its broader aspects, is therefore not limited to the specific details shown and described. Various alterations, modifications and variations will be apparent to those skilled in the art in light of the foregoing description. Thus, it should be understood that the present invention is not limited by the foregoing description, but embraces all such alterations, modifications and variations in accordance with the spirit and scope of the appended claims.

What is claimed is:

1. An antenna structure for a RFID tag interrogatable by at least one reader, comprising:
   a first antenna portion, comprising first and second electrostatic elements, that is responsive to an electrostatic interrogation signal at at least one first frequency; and
   a second antenna portion, comprising first and second electromagnetic elements, that is responsive to a far-field electromagnetic signal at at least one second frequency,
   wherein the first electrostatic element comprises a first non-resonant plate and the first electromagnetic element, and the second electrostatic element comprises a second non-resonant plate and the second electromagnetic element.

2. The antenna of claim 1, wherein the first antenna portion is responsive to the electrostatic interrogation signal at at least two frequencies.

3. The antenna of claim 1, wherein the second antenna portion is responsive to the far-field electromagnetic interrogation signal at at least two frequencies.

4. The antenna of claim 3, wherein the second antenna portion is slotted to be responsive to the far-field electromagnetic interrogation signal at at least two frequencies.

5. The antenna of claim 1, wherein the first antenna portion is made from a material of a first conductivity, and wherein the second antenna portion is made from a material of a second conductivity.

6. The antenna of claim 5, wherein the first conductivity is lower than the second conductivity.

7. The antenna of claim 1, wherein the second antenna portion is directly connected to circuitry on the tag.

8. The antenna of claim 7, wherein the second antenna portion electrically intervenes between the first antenna portion and the circuitry on the tag.

9. The antenna of claim 1, wherein both the first antenna portion and the second antenna portion are directly connected to circuitry on the tag.

10. The antenna of claim 1, wherein the first and second antenna portions are formed on a single substrate.

11. The tag of claim 1, wherein the circuitry comprises a frequency detecting circuit capable of determining the frequency of the at least one first frequency and the at least one second frequency.

12. The tag of claim 11, wherein the frequency detecting circuit further comprises a clock generating circuit for generating a local clock for the tag.

13. The tag of claim 12, wherein the local clock varies in accordance with the determined frequency.

14. The tag of claim 12, wherein the local clock is independent of the determined frequency.

15. The tag of claim 1, wherein the circuitry comprises a phase locked loop circuit for deriving a local clock signal carried with either interrogation signal.

16. The tag of claim 1, wherein the circuitry comprises at least one power extraction circuit for deriving power for the tag from either interrogation signal.

17. The tag of claim 1, wherein the circuitry further comprises a receiver for accepting data from the reader.

18. A RFID tag interrogatable by at least one reader, comprising:
    an antenna structure on a substrate, comprising
        a first antenna portion, comprising first and second electrostatic elements, that is responsive to an electrostatic interrogation signal at at least one first frequency; and
        a second antenna portion, comprising first and second electromagnetic elements, that is responsive to a far-field electromagnetic signal at at least one second frequency,
        wherein the first electrostatic element comprises a first non-resonant plate and the first electromagnetic element, and the second electrostatic element comprises a second non-resonant plate and the second electromagnetic element; and
    an integrated circuit mounted to the substrate and coupled to the antenna for providing data from the tag to the reader in response to either the electrostatic or far-field electromagnetic interrogation.

19. The tag of claim 18, wherein either or both of the electrostatic and electromagnetic antenna portions are responsive to their interrogation signals at at least two frequencies.

20. The tag of claim 18, wherein the electrostatic antenna portion is made from a material of a first conductivity, and wherein the electromagnetic antenna portion is made from a material of a second conductivity, and wherein the first conductivity is lower than the second conductivity.

21. The tag of claim 18, wherein the electromagnetic antenna portion is directly connected to the integrated circuit on the tag.

22. The tag of claim 21, wherein the electromagnetic antenna portion electrically intervenes between the electrostatic antenna portion and the integrated circuit on the tag.

23. The tag of claim 18, wherein the integrated circuit comprises a frequency detecting circuit capable of determining the frequency of the at least one first frequency and the at least one second frequency.

24. The tag of claim 23, wherein the frequency detecting circuit further comprises a clock generating circuit for generating a local clock for the tag.

25. The tag of claim 18, wherein the integrated circuit comprises a phase locked loop circuit for deriving a local clock signal carried with either interrogation signal.

26. The tag of claim 18, wherein the integrated circuitry comprises at least one power extraction circuit for deriving power for the tag from either interrogation signal.

27. The tag of claim 18, wherein the integrated circuit further comprises a receiver for accepting data from the reader.

* * * * *